Oct. 16, 1956     E. E. HERROD     2,766,975
SUBSURFACE INJECTOR
Filed Dec. 7, 1951
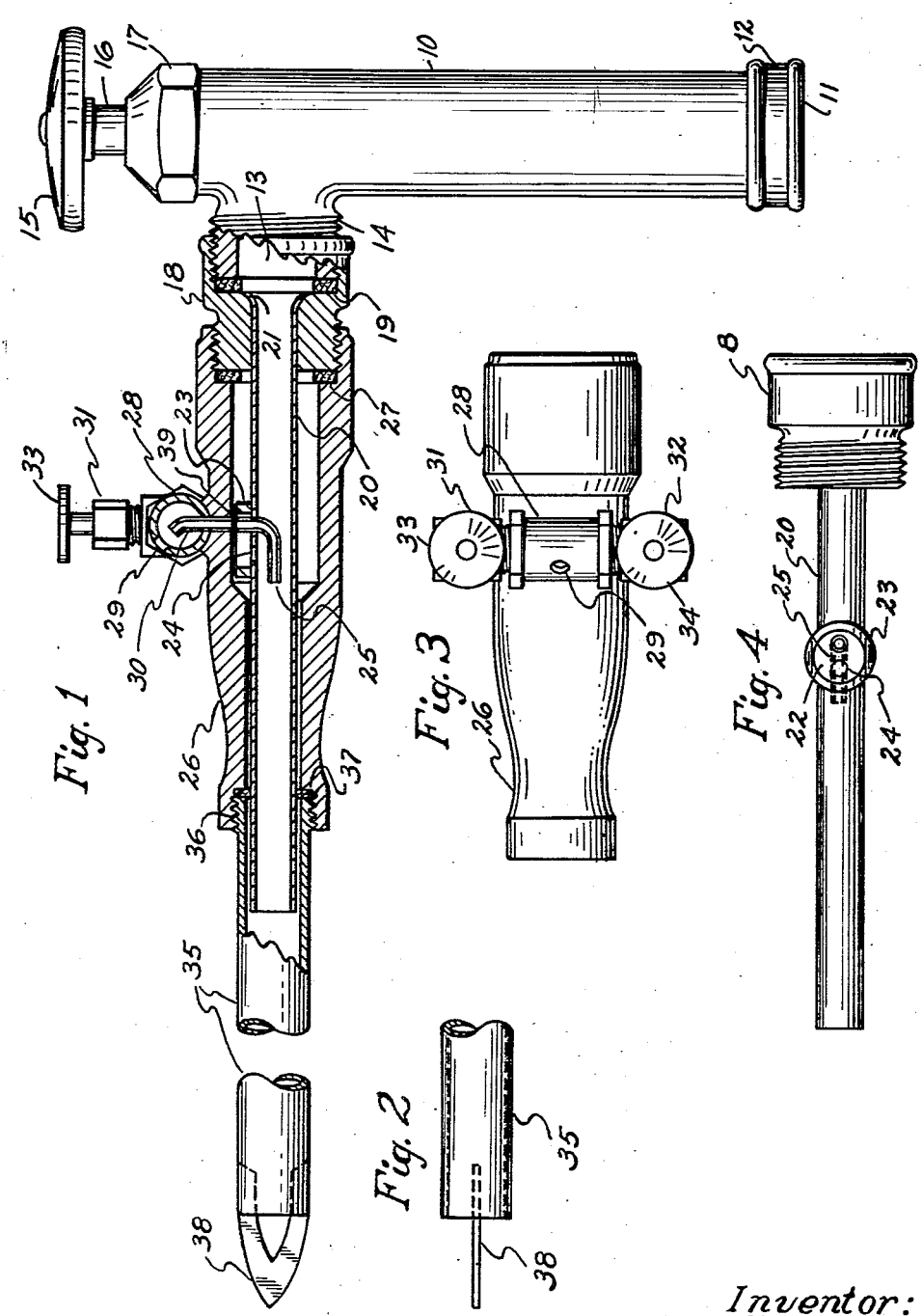
Inventor:
ECIL E. HERROD,
By
Munn, Liddy & Nathanson
Attorneys United States Patent Office 2,766,975
Patented Oct. 16, 1956

2,766,975

SUBSURFACE INJECTOR

Ecil Edward Herrod, Baton Rouge, La., assignor to Jasper B. Herrod

Application December 7, 1951, Serial No. 260,539

4 Claims. (Cl. 261—18)

The invention relates to devices for injecting liquids, gases and other substances into soil, grain, or other material in order to aerate, irrigate and fertilize such material or compositions. The invention further relates to means for injecting substances into such material in order to exterminate vermin and insects and to destroy plant diseases.

The purpose or object of my invention is to provide a means for treating soil or other material by injecting substances therein. Through the use of my invention water can be injected into soil, for instance, for irrigation, air and water can be injected into soil for aeration, liquid of suspended fertilizers can be injected for plant feeding, and insecticides can be injected for extermination purposes.

Other objects are to provide a means whereby soil or other substances can be treated by irrigation, aeration, fertilization or extermination in separate operations or procedures or the substances can be treated in more than one manner in a single operation; to provide an injector which embodies a novel and efficient means for mixing the substances with which material is to be treated with a medium or carrier which serves to carry such substances into the material to be treated. To provide an injector which can be easily disassembled for cleaning purposes. To provide an injector which may be readily attached to hoses or other supply lines.

It is additionally an object of this invention to provide an injector which is light and simple in construction and which can be manufactured at a reasonable cost.

The above and other objects and advantages will become apparent from the following description and the accompanying drawings, in which:

Figure 1 is a side elevational view, partly in section, showing the assembled injector embodying my invention.

Figure 2 is a plan view of the left end portion of the device shown in Figure 1.

Figure 3 is a plan view of the injector body shown in Figure 1.

Figure 4 is a plan view of a jet tube forming a part of my invention.

Similar reference numerals in the several figures, indicate similar parts.

With previously known injectors of the type described herein difficulty in properly mixing injection substances with the conveying medium is often experienced. As a result clogging of the injector is likely to occur, and proper uniform treatment of soils, etc. is impossible with such injectors. As a result of the improper functioning of the previously known injectors the treated materials, soils or plants are sometimes damaged instead of improved by the injecting procedures.

With my invention it is possible to adequately and thoroughly mix injecting substances with the conveying medium and thus the difficulties experienced with known devices of a similar kind have been overcome.

Referring to the drawings in detail, reference character 10 designates the handle which consists generally of a cylinder having a central bore. An inlet opening 11 having a female connection 12 is provided at one end thereof. Adjacent the other end of the handle there is an outlet passageway 13 which is in communication with the handle bore. Male coupling threads 14 are formed on the handle projection defining the outlet passageway. A suitable main shut off valve and valve seat are provided within the handle 10 between the inlet and outlet openings. Such valve is operated by handle 15 attached to the stem 16. A packing gland nut 17 is threaded onto the handle 10. The valve, valve seat, and operating mechanism are not illustrated since such can be of any suitably known construction and does not form a part of the present invention.

A jet tube connector 18 engages with threads 14, and a gasket 19 is provided to prevent leakage. Within the tube connector an elongated cylindrical jet tube 20 is provided. The jet tube as shown closely interfits with connector 18 and has a flared end 21 which is in engagement with a complementarily flared portion of the connector. The jet tube may be attached to the connector by brazing, or the jet tube and connector may be provided with larger flared ends and held in respective position by gasket 19.

On the upper surface of tube 20, as shown in Figures 1 and 4, a vacuum chamber 23 is provided. The vacuum chamber comprises a cylindrical tube or pipe having open ends. The pipe has depending flared legs, not shown, which abut the tube 20 and which are attached thereto by means such as brazing. Thus the tube 20 and the pipe form a chamber defined by the pipe and the upper surface of tube 20. Opening 24 connects the interior of tube 20 with the vacuum chamber. Numeral 25 indicates a vacuum chamber conduit which is attached to tube 20 and extends upwardly into chamber 22 and downwardly into tube 20.

The lower portion of the conduit extends parallel to tube 20 and is positioned in the center thereof. Housing 26 threadingly engages jet tube connector 18. A washer or gasket 27 prevents leakage between elements 26 and 18. Upon the upper surface of housing 26 an open-ended mixing chamber 28 provided with an opening 29 is secured.

Mixing chamber tube 30 extends downwardly from chamber 28 into the interior of housing 26 and is positioned in alignment with the upper end of conduit 25. The upper end of tube 30 extends towards and is in alignment with opening 29. Intake valves 31 and 32 are threadingly connected respectively to opposite ends of chamber 28. The valves may be of any proper type available, and no novelty is asserted therein. As shown, the intake valves 31 and 32 have operating handles 33 and 34, respectively. The valve casings have female threads for attachment of vessels or pipes containing materials to be injected.

A ground drill which comprises a tube or pipe 35 having a central bore is connected to housing 26 by means such as threads 36. A washer 37 insures a leak-proof fit. The washer 37 extends inwardly to the tube 20 and provides additional support therefor. Separator 38 is attached to tube 35 adjacent the open end thereof to facilitate insertion of the injector into soil, etc. The separator, as shown, comprises a pointed blade and can be formed of any material of adequate strength. The tube 35 may be of any length. It should be noted that the tube may be provided with spaced openings extending through the side thereof for increasing the treating area, and also the tube may be provided with an integrally formed pointed end. The separator 38 may also be of a different construction.

The above described device can be assembled by screwing the ground tube 35 into the injector body piece 26 with the insertion of gasket 37. Next jet tube connector 18 is screwed into the injector body piece 26 with the insertion of gasket 27, with the tube 20 positioned so that the vacuum chamber conduit 25 is aligned with the mixing chamber tube 30. The handle 10 is then screwed into the jet tube connector 18 with the insertion of another gasket 19. When assembled, tubes 25 and 30 will be separated by a small gap 39.

The invention may be operated by attaching the hose connection 11 to a source of either water, air, or steam under pressure. By opening the main shut-off valve to allow the water, air, or steam to enter the device, the fluid will flow through the jet tube 20, and out through the ground tube 35. The fluid in passing around the vacuum chamber tube 25 and underneath chamber 23 will create a suction in the vacuum chamber tube 25 and in the hole 24. This suction causes air to be drawn through the mixing chamber tube 30 and hole 24, and draws air into the device through the hole 29. The suction also will draw injecting material through the two intake valves 31 and 32 from vessels or tanks attached or connected to the valves into chamber 28 providing such valves are open. The first mixing of air and fluid or gas takes place in chamber 28. From chamber 28 the mixture travels through the mixing chamber tube 30 into the vacuum chamber 23 crossing gap 39, at which point a portion of the mixture continues in the vacuum chamber tube 25 into tube 20. This portion of the mixture thoroughly mixes with the carrier medium in tube 20 due to the fact that the conduit 25 and opening 24 cause the flow of the medium to be disrupted. The other part of the mixture in chamber 23 passes through hole 24 reaching the jet tube 20 in a thoroughly mixed form. There this latter part also thoroughly mixes with the conducting medium. A high degree of homogeneity is obtained because of the construction disclosed. This mixing is so thorough that it is capable of emulsifying water and gasoline together.

For use in soil the device is connected to a source of water and the ground drill pushed into the soil with the water pressure, water and the ground separator 38 tending to clear a path for the ground tube 35. If the water does not clear a path for the tube as the tube is inserted into the ground, the end of the tube may become stopped up causing the full water pressure to act on the device. When this occurs the water can blow-back or escape through the vacuum chamber tube 25 and hole 24 to the mixing chamber tube 30 and out through the mixing chamber hole 29. As this entire discharge has to pass out through the mixing chamber tube 30 which is directed at the hole 29, the escaping water does not back up into any vessels connected to the intake valves 31 and 32. The amount of air entering the hole 29 can be controlled by the operator or could be controlled by an additional valve.

The water thus inserted into the soil under pressure irrigates by penetrating, loosening, and lifting the soil. By allowing air to enter hole 29, the soil also becomes aerated. By attaching vessels of liquid fertilizer and liquid or gaseous insecticides to the intake valves 31 and 32 the soil can be fertilized and insects and vermin in the soil can be exterminated. By attaching two or more vessels with different contents, it is possible to irrigate, aerate, and fertilize the soil and exterminate in one single operation.

For use in grain or other loose aggregates this device is connected to a source of air or other gas and inserted into the aggregate. By attaching vessels containing liquid or gaseous insecticides and fungicides to the intake valves, it also is possible to treat the aggregate for control of insects, fungus, weavils and other undesirable attributes.

It is contemplated that the device could be modified in many ways within the scope of the invention. The mixing chamber 28, for instance, may be in threaded engagement with housing 26 and might also extend downwardly therein. Furthermore, the tube 30 may be supported solely by chamber 28, or the tube may be dispensed with and the passageway between chamber 28 and the interior of housing 26 provided by a suitable bore or passageway. As pointed out above it is also contemplated that a valve may be provided for controlling the entrance of air through opening 29.

From the above description and accompanying drawings, it will be appreciated that I have devised an injector which is so constructed that proper mixing of injecting materials and air with a conveying medium can be attained. With my device a thorough and intimate mixing of injecting materials is achieved. As a result, I have overcome the objectionable features of the previously known injectors.

While I have shown and described a preferred form of my invention it will be understood that variations in details of form may be made without departure from the invention as defined in the appended claims.

I claim:

1. An injector comprising a housing having a longitudinally extending bore, a jet tube supported within said housing within said bore, said jet tube having a flared end, a connector in engagement with said flared end and in engagement with one end of said housing and serving to support said flared end of said jet tube within said housing, additional support means at the other end of said housing for supporting the other end of said jet tube, said jet tube having a vacuum chamber mounted thereon, a conduit leading from said vacuum chamber into said tube, a mixing chamber mounted on said housing above said vacuum chamber and having a mixing chamber tube in alinement with said conduit for passage of material from said mixing chamber to said vacuum chamber and said conduit, an opening extending between said vacuum chamber and the interior of said tube spaced from said conduit, means forming an opening for the entrance of air into said mixing chamber, and means for connecting said mixing chamber to a source of material to be injected.

2. An injector comprising a handle portion, said handle portion being hollow and having inlet and outlet openings therein, a coupling means on said handle at each opening, a jet tube comprising an extended conduit forming a fluid passageway, said jet tube having a flared end, a connector having a flared inner surface in engagement with the flared end of said tube and in coupled connection with the outlet opening coupling means, a housing generally enclosing said tube and in coupled engagement with said connector, said housing having at one end a supporting means in engagement with said tube for supporting the end of said tube opposite said flared end, said jet tube having a vacuum chamber mounted thereon and received within said housing, an opening extending through a wall of said tube into said vacuum chamber, a conduit spaced from said opening and interconnecting said jet tube centrally thereof with said vacuum chamber, and a mixing chamber mounted on said housing and having a tube for connecting said mixing chamber with said vacuum chamber, and means for connecting said mixing chamber to a source of material to be injected.

3. An injector for treating materials comprising a handle, said handle constituting a conduit having inlet and outlet openings and a valve positioned intermediate said openings, coupling means adjacent said outlet opening, a connector in engagement with said coupling means, said connector having a flared inner surface, a jet tube having at one end thereof a flared outer surface in supporting contact with said connector, a housing, means mounting and supporting said housing at one end on said connector, said housing having a mixing chamber, means for introducing a fluid from said mixing chamber into said tube, one end of said housing being provided with coupling means including a threaded opening, a washer mounted at the inner end of said opening and extending inwardly of said housing in engagement with said tube adjacent an end of said tube opposite said flared end so as to support said tube in said housing, and an element in engagement with said threaded coupling of said tube and in compressing relationship with said washer so as to maintain said washer in position, and means for connecting said mixing chamber to a source of material to be injected.

4. An injector comprising a connector for connecting said injector to a fluid source, said connector having a flared inner surface, a jet tube having a flared outer surface and engaged with the flared inner surface of said connector, a housing receiving said jet tube for a substantial portion of its length, said housing having coupled relation with said connector at one end, mixing means mounted on said housing and means for introducing fluid from said mixing means into said tube, said housing having at its other end a coupling means including an inwardly extending opening, an element in engagement with said coupling means, a washer extending inwardly of said housing mounted in said inwardly extended opening and held in position therein by said element, said washer engaging said tube at one end thereof to mount said tube in fixed relationship with said housing, and means for connecting said mixing means to a source of material to be injected.

References Cited in the file of this patent

UNITED STATES PATENTS

| | | |
|---|---|---|
| 811,749 | Somers | Feb. 6, 1906 |
| 1,922,920 | Aherne | Aug. 15, 1933 |
| 2,198,998 | Honsberger | Apr. 30, 1940 |
| 2,212,288 | Decker | Aug. 20, 1940 |
| 2,214,083 | Lester | Sept. 10, 1940 |
| 2,302,799 | Peterson | Nov. 24, 1942 |
| 2,325,242 | Gordon | July 27, 1943 |
| 2,333,727 | Lucas | Nov. 9, 1943 |
| 2,540,064 | Weber | Jan. 30, 1951 |
| 2,543,813 | Stover | Mar. 6, 1951 |
| 2,570,004 | Penny | Oct. 2, 1951 |
| 2,571,871 | Hayes | Oct. 16, 1951 |
| 2,690,717 | Goodrie | Oct. 5, 1954 |

FOREIGN PATENTS

| | | |
|---|---|---|
| 18,040 | Great Britain | of 1905 |